(12) United States Patent
Duan et al.

(10) Patent No.: US 12,675,014 B1
(45) Date of Patent: Jul. 7, 2026

(54) BACKLIT ROAD TRAFFIC SIGN

(71) Applicant: Jialiang Duan, Shenzhen (CN)

(72) Inventors: Jialiang Duan, Shenzhen (CN);
Guanghui Wang, Yingshan County
(CN)

( * ) Notice: Subject to any disclaimer, the term of this
patent is extended or adjusted under 35
U.S.C. 154(b) by 0 days.

(21) Appl. No.: 19/534,903

(22) Filed: Feb. 10, 2026

(30) Foreign Application Priority Data

Jan. 23, 2026 (CN) .......................... 202620096600.0

(51) Int. Cl.
G09F 13/18 (2006.01)
F21S 9/03 (2006.01)
F21V 8/00 (2006.01)
F21Y 115/10 (2016.01)
G02F 1/13357 (2006.01)
G09F 9/33 (2006.01)

(52) U.S. Cl.
CPC ..... G02F 1/133615 (2013.01); G02B 6/0038
(2013.01); G02B 6/0061 (2013.01); **G02B
6/0068 (2013.01); G02B 6/008** (2013.01);
G02B 6/0088 (2013.01); G02B 6/009
(2013.01); F21Y 2115/10 (2016.08)

(58) Field of Classification Search
CPC ......... G09F 9/33; G09F 13/18; G09F 13/0472
See application file for complete search history.

(56) References Cited

U.S. PATENT DOCUMENTS

| | | | | | |
|---|---|---|---|---|---|
| 5,819,455 | A | * | 10/1998 | Tsuda | G09F 9/33 |
| | | | | | 40/550 |
| 6,147,623 | A | * | 11/2000 | Rippen | G08G 1/0955 |
| | | | | | 40/586 |
| 9,799,241 | B2 | * | 10/2017 | Stockton | G09F 13/16 |
| 11,276,336 | B2 | * | 3/2022 | Schmidling | G09F 13/18 |
| 12,106,686 | B2 | * | 10/2024 | Xie | G09F 9/33 |
| 2005/0270802 | A1 | * | 12/2005 | Hsu | G02F 1/133615 |
| | | | | | 362/626 |
| 2011/0013416 | A1 | * | 1/2011 | Kim | G02B 6/0038 |
| | | | | | 362/613 |
| 2012/0134177 | A1 | * | 5/2012 | Kim | G02B 6/0061 |
| | | | | | 362/606 |
| 2015/0055360 | A1 | * | 2/2015 | Hollingworth | B60Q 1/2607 |
| | | | | | 362/511 |
| 2019/0043352 | A1 | * | 2/2019 | Baek | F24S 25/10 |
| 2019/0272779 | A1 | * | 9/2019 | Gamble | G09F 21/048 |

(Continued)

*Primary Examiner* — Shin H Kim
(74) *Attorney, Agent, or Firm* — Nicholas Makridakis

(57) ABSTRACT

A backlit road traffic sign is provided, including a housing
body, a control box, a main light-emitting device, and
multiple warning light devices. The housing body is a flat
structure and includes a frame, a rear panel, a front panel, a
light-blocking film, a reflective base film, and a reflective
pattern film. The main light-emitting device is disposed
within the sealed cavity and electrically connected to the
control box, light emitted from the main light-emitting
device projected outward through the multiple first slot
holes, the front panel, the reflective base film, and the
multiple second slot holes sequentially. By incorporating a
main light-emitting device, this product achieves backlit
self-illumination of its signage patterns. Combined with
multiple warning light devices, it generates high-intensity
flashing perimeter illumination. This design ensures visibil-
ity exceeding 1,000 feet, delivering exceptional visibility
range and viewing angles.

10 Claims, 6 Drawing Sheets

(56) References Cited

U.S. PATENT DOCUMENTS

| | | | |
|---|---|---|---|
| 2021/0264824 A1* | 8/2021 | Schmidling | G09F 13/0413 |
| 2023/0231090 A1* | 7/2023 | Tang | F21S 43/26 |
| | | | 257/79 |
| 2024/0135841 A1* | 4/2024 | Xie | G09F 9/33 |
| 2024/0233584 A9* | 7/2024 | Xie | G09F 9/33 |
| 2025/0284047 A1* | 9/2025 | Xiong | F21V 19/00 |

* cited by examiner

BACKLIT ROAD TRAFFIC SIGN

TECHNICAL FIELD

The present application relates to the technical field of road traffic sign, and in particular to a backlit road traffic sign.

BACKGROUND

Traffic signs are facilities that convey specific traffic management information to road users through graphic symbols, colors, shapes, and text. They embody road traffic regulations and serve as behavioral guidelines that all traffic participant (drivers, pedestrians, and cyclists) must adhere to. Simply put, they are the "silent traffic police" on the road, informing us where we can go, where we cannot go, how fast we should go, and what road conditions lie ahead.

Currently, traditional traffic signs generally only have retro-reflective properties. Without light sources, their visibility distance and viewing angles are limited, making warning signs insufficiently conspicuous. This can lead to driving errors and traffic safety hazards. Therefore, it is necessary to improve the current traffic signs.

SUMMARY

In view of the above, the present application aims to provide a backlit road traffic sign, that effectively addresses the issues of poor visibility distance and viewing angle, as well as insufficiently conspicuous warning signs, present in existing road traffic signs.

To achieve the above objectives, the present application adopts the following technical solutions.

In some embodiments of the present application, a backlit road traffic sign is provided, including a housing body, a control box, a main light-emitting device, and multiple warning light devices. Herein, the housing body is a flat structure and includes a frame, a rear panel, a front panel, a light-blocking film, a reflective base film, and a reflective pattern film. The rear panel is positioned on the rear side of the frame. The front panel is made of light-transmitting material and positioned on the front side of the frame, with the front panel, the rear panel, and the frame collectively enclosing a sealed cavity. The light-blocking film is made of non-light-transmitting material and attached to the back surface of the front panel, with multiple first through holes and multiple first slot holes for forming patterns formed through a front surface and a back surface of the light-blocking film, the multiple first through holes arranged around a periphery of the light-blocking film. The reflective base film is made of a light-transmitting material and attached to a front surface of the front panel. The reflective pattern film is made of a light-transmitting material and attached to a front surface of the reflective base film, with multiple second through holes and multiple second slot holes for forming patterns formed through a front surface and a rear surface of the reflective pattern film, the multiple second through holes arranged around a periphery of the reflective pattern film.

The control box is mounted on a back surface of the rear panel.

The main light-emitting device is disposed within the sealed cavity and electrically connected to the control box, light emitted from the main light-emitting device projected outward through the multiple first slot holes, the front panel, the reflective base film, and the multiple second slot holes sequentially.

The multiple warning light devices are arranged around the periphery of the sealed cavity and electrically connected to the control box, light emitted from the warning light devices projected outward through the corresponding first through holes, the front panel, the reflective base film, and corresponding second through holes.

Further, the main light-emitting device has a heat sink, a light guide plate, and a light strip, and the heat sink forms a side-opening slot. A front surface of the light guide plate is a light-emitting surface, and the light-emitting surface faces the back surface of the light-blocking film, with an end of the light guide plate engaging with the side-opening slot. The light strip is embedded in the side-opening slot and attached to the heat sink, and electrically connected to the control box, carrying multiple first light beads, the multiple first light beads arranged at intervals along a length of the light strip and facing an end face of the light guide plate.

Further, a count of the heat sinks is two and the two heat sinks are symmetrically disposed at two ends of the light guide plate, with the two ends of the light guide plate respectively engaged with the side-opening slots of the two heat sinks. Correspondingly, a count of the light strips is two and the two light strips are embedded in the side-opening slots of the heat sinks respectively and attached to the two heat sinks. The two light strips are electrically connected to the control box, and the multiple first light beads on each light strip face the two end faces of the light guide plate respectively.

Further, a reflective paper is attached to the back surface of the light guide plate.

Further, the heat sink is an elongated aluminum profile.

Further, the warning light device has a light panel and a light shield. The light panel, having the multiple second light beads, is attached to the rear panel and electrically connected to the control box. The light shield is fixed to the light panel and defines light-emitting holes positioned directly above the multiple second light beads, with each light-emitting hole aligned with the corresponding first through hole.

Further, the frame is an aluminum frame, and the rear panel is an aluminum plate.

Further, a mounting rail is fixed to the back surface of the rear panel.

Further, the mounting rails are two symmetrically arranged rails.

Further, a solar photovoltaic panel is attached to the front surface of the reflective pattern film and electrically connected to the control box, with multiple third through holes and multiple third slot holes for forming patterns formed through a front surface and a back surface of the solar photovoltaic panel. The multiple third through holes are arranged around the periphery of the solar photovoltaic panel and respectively aligned with and in communication with the multiple second through holes, and the multiple third slot holes are respectively aligned with and in communication with the multiple second slot holes.

The present application has the following beneficial effects:

By incorporating a main light-emitting device, this product achieves backlit self-illumination of its signage patterns. Combined with multiple warning light devices, it generates high-intensity flashing perimeter illumination. This design ensures visibility exceeding 1,000 feet, delivering exceptional visibility range and viewing angles. The highly conspicuous warning signage effectively prevents driving errors and traffic hazards, significantly enhancing operational performance.

Figure 1:
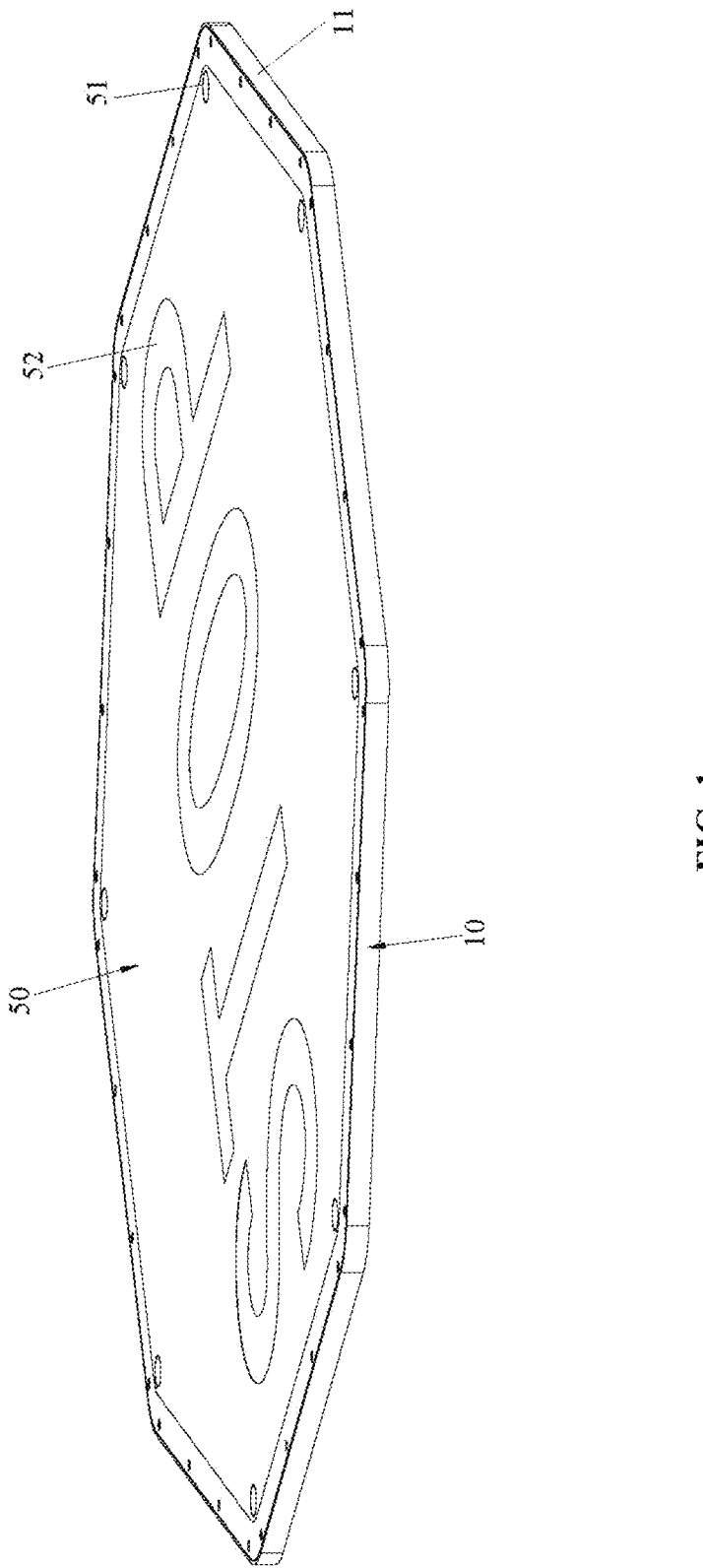
FIG. 1 shows an assembled isometric view of the backlit road traffic sign in accordance with some embodiments of the present application.

In the drawings, reference numerals are as follows.

10. Housing body, 11. Frame, 12. Rear panel, 13. Front panel, 14. Light-blocking film, 141. First through hole, 142. First slot hole, 15. Reflective base film, 16. Reflective pattern film, 161. Second through hole, 162. Second slot hole, 17. Mounting rail, 101. Sealed cavity, 20. Control box, 30. Main light-emitting device, 31. Heat sink, 311. Side-opening slot, 32. Light guide plate, 321. Light-emitting surface, 33. Light strip, 331. First light bead, 34. Reflective paper, 40. Warning light device, 41. Light panel, 411. Second light bead, 42. Light shield, 421. Light-emitting hole, 50. Solar photovoltaic panel, 51. Third through hole, 52. Third slot hole

DETAILED DESCRIPTION OF THE EMBODIMENTS

To make the objectives, technical solutions, and advantages of the backlit road traffic sign of the present application more clear and understandable, the following will provide a further detailed explanation in conjunction with accompanying drawings and embodiments. It should be understood that the specific embodiments described herein are solely for illustrative purposes of the backlit road traffic sign of the present application and are not intended to limit the present application.

The following will provide a detailed description of the specific implementation of the backlit road traffic sign of the present application in conjunction with specific embodiments.

Figure 2:
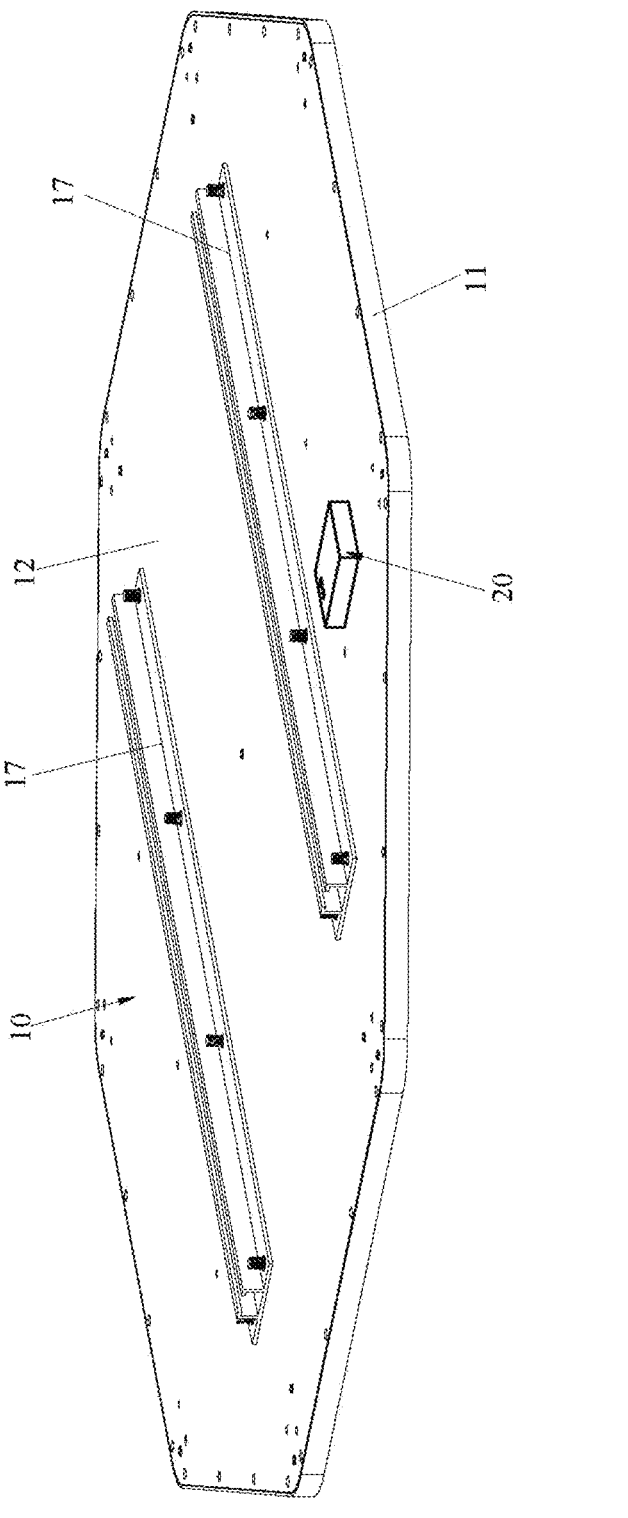
FIG. 2 shows an assembled isometric view of the backlit road traffic sign from another angle in accordance with some embodiments of the present application.
Figure 3:
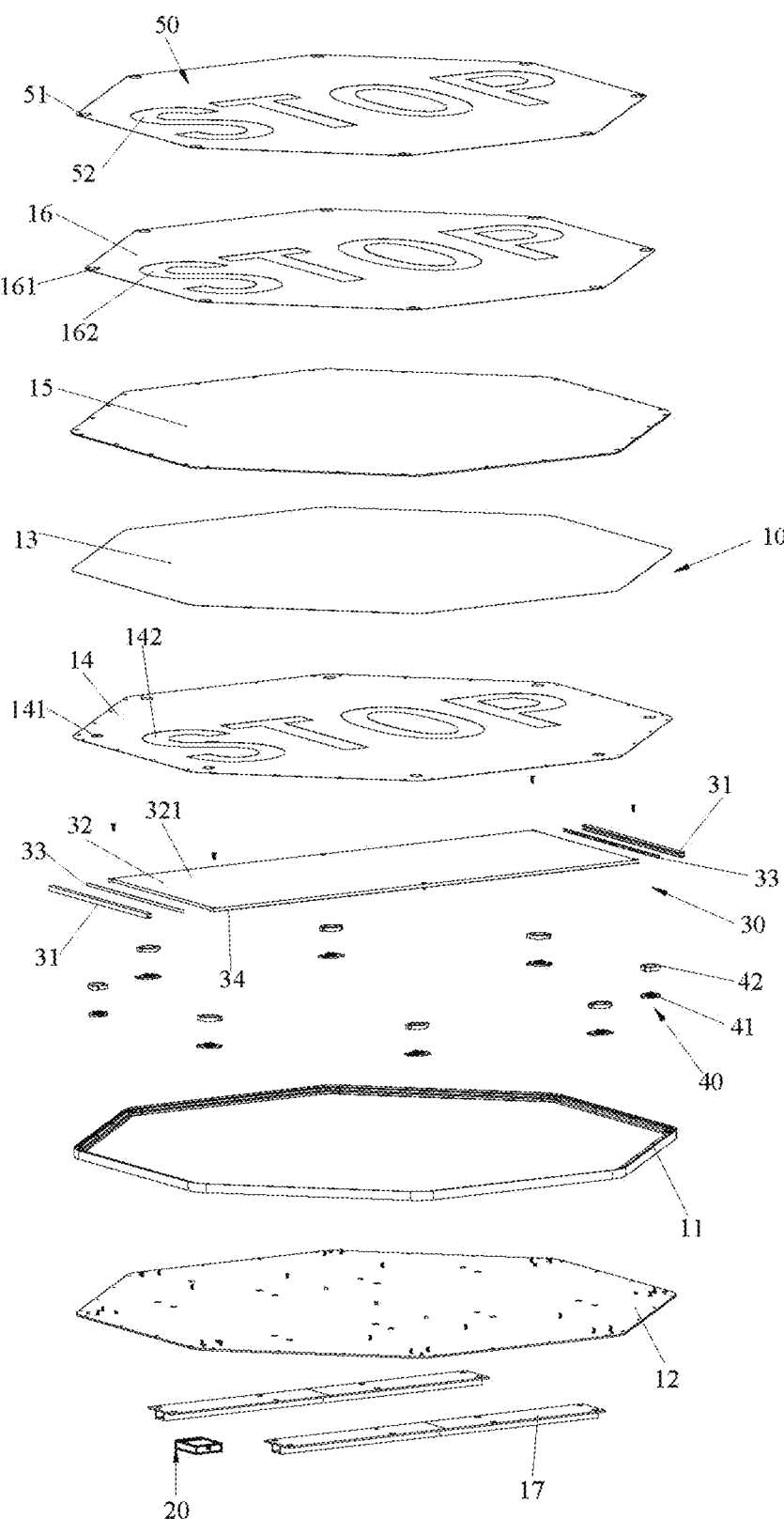
FIG. 3 shows an exploded view of the backlit road traffic sign in accordance with some embodiments of the present application.
Figure 4:
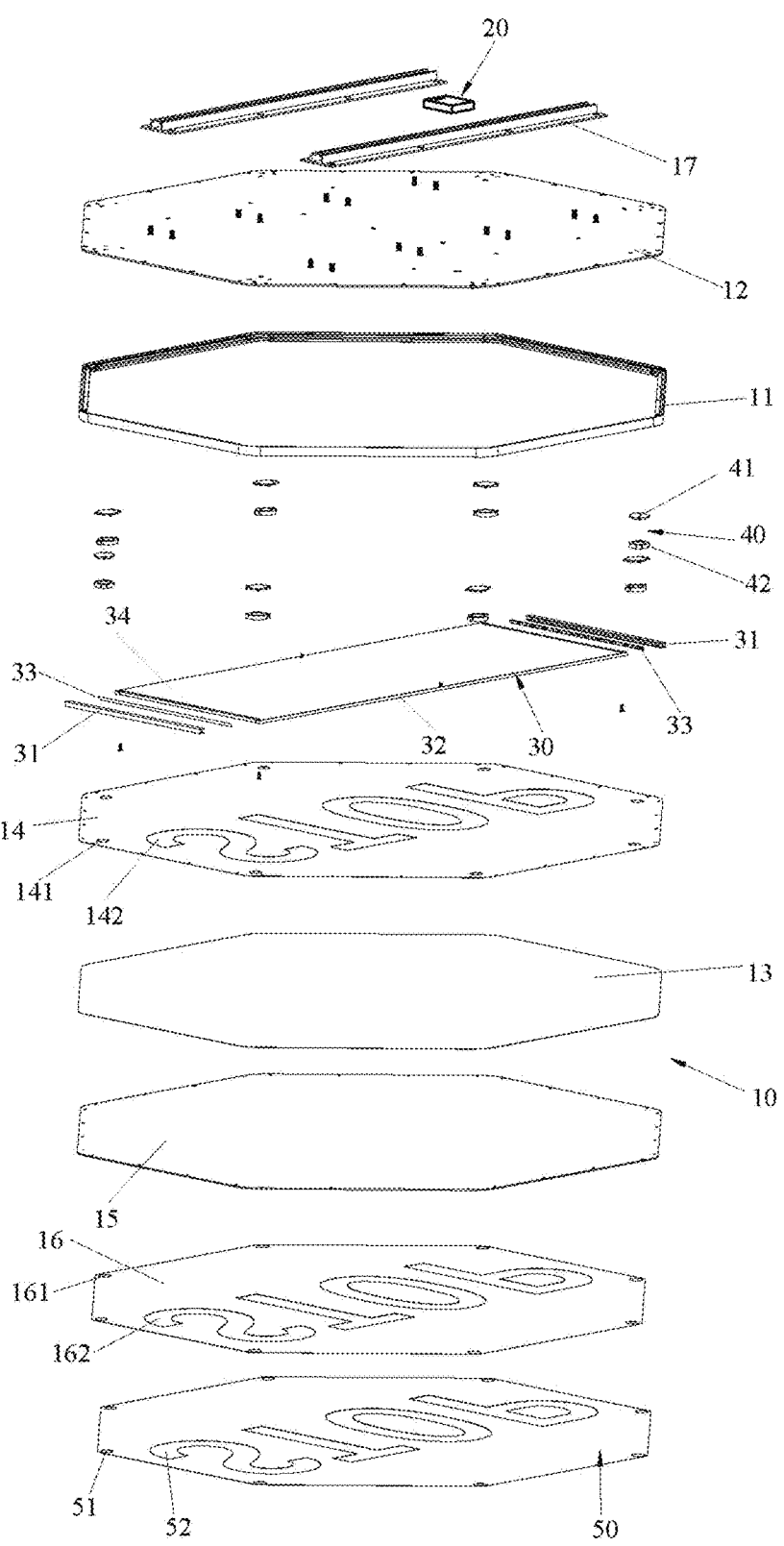
FIG. 4 shows an exploded view of the backlit road traffic sign from another angle in accordance with some embodiments of the present application.
Figure 5:
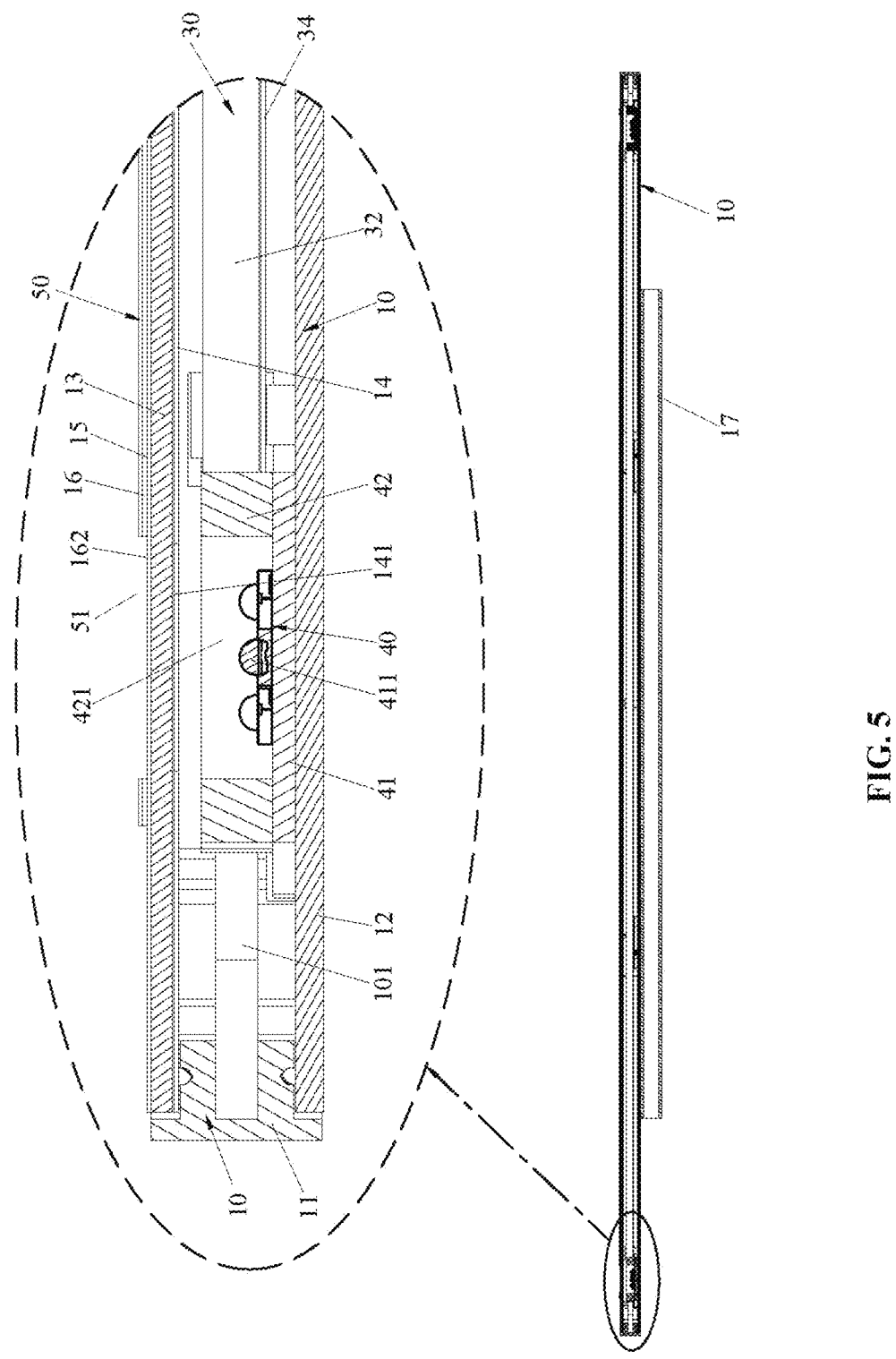
FIG. 5 shows a cross-sectional view of the backlit road traffic sign in accordance with some embodiments of the present application.
Figure 6:
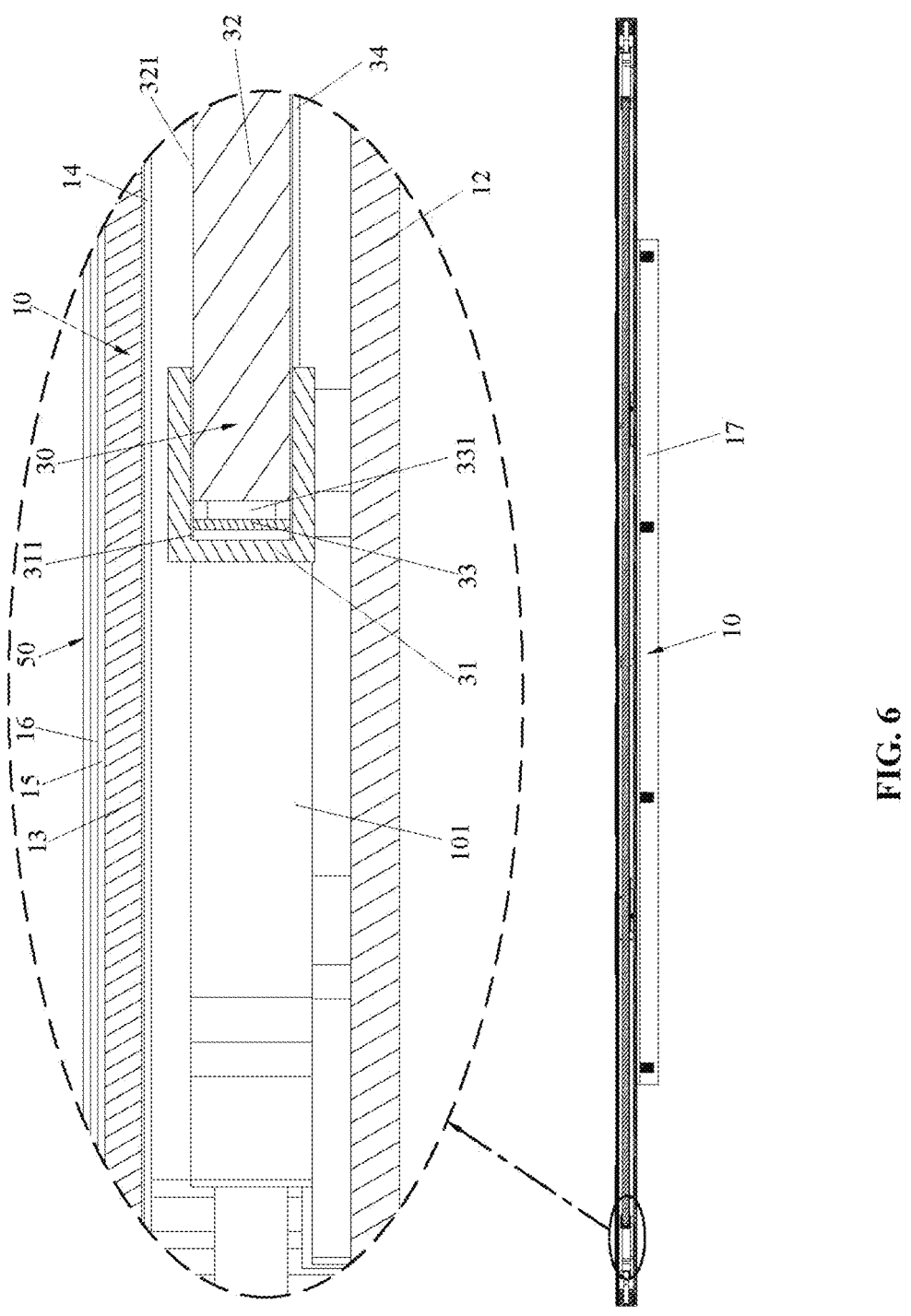
FIG. 6 shows another cross-sectional view of the backlit road traffic sign in accordance with some embodiments of the present application.

Referring to FIGS. 1-6, in some embodiments of the present application, herein provided a backlit road traffic sign, including a housing body 10, a control box 20, a main light-emitting device 30, and multiple warning light devices 40.

The housing body 10 has a flat structure and includes a frame 11, a rear panel 12, a front panel 13, a light-blocking film 14, a reflective base film 15, and a reflective pattern film 16. The rear panel 12 is positioned on the rear side of the frame 11. The front panel 13 is made of light-transmitting material and positioned on the front side of the frame 11, with the front panel 13, the rear panel 12, and the frame 11 collectively enclosing a sealed cavity. The light-blocking film 14 is made of non-light-transmitting material and attached to the back surface of the front panel 13, with multiple first through holes 141 and multiple first slot holes 142 for forming patterns formed through a front surface and a back surface of the light-blocking film 14, the multiple first through holes 141 arranged around a periphery of the light-blocking film 14. The reflective base film 15 is made of a light-transmitting material and attached to a front surface of the front panel 13. The reflective pattern film 16 is made of a light-transmitting material and attached to a front surface of the reflective base film 15, with multiple second through holes 161 and multiple second slot holes 162 for forming patterns formed through a front surface and a rear surface of the reflective pattern film 16, the multiple second through holes 161 arranged around a periphery of the reflective pattern film 16. The outer contour of the housing body 10 is a regular polygon. In some embodiment, it is an octagon, but it may also be other shapes without limitation. The frame 11 is an aluminum frame with a ring-shaped, integrally formed structure. The width of the frame 11 is 12 mm, providing good structural strength. The rear panel 12 is an aluminum plate, offering excellent structural strength and heat dissipation performance. The front panel 13 is made of acrylic material, without limitation. The light-blocking film 14 has eight first through holes 141, each circular in shape, without limitation. The reflective pattern film 16 has eight second through holes 161, each circular in shape, without limitation. Additionally, the rear panel 12 has mounting rails 17 fixed to its back surface, with two symmetrically arranged mounting rails 17.

The control box 20 is mounted on the back surface of the rear panel 12. In some embodiment, the control box 20 is a waterproof enclosure, with main components such as a main control board, a battery, and the like inside. Its specific structure and operating principles are well-known in the related art and are not described in detail herein.

The main light-emitting device 30 is disposed within the sealed cavity 101 and is electrically connected to the control box 20. The light emitted from the main light-emitting device 30 projected outward through the multiple first slot holes 142, the front panel 13, the reflective bottom film 15, and the multiple second slot holes 162 sequentially. Specifically, the main light-emitting device 30 includes a heat sink 31, a light guide plate 32, and a light strip 33. The heat sink 31 forms a side-opening slot 311. The front surface of the light guide plate 32 is a light-emitting surface 321, which faces the back surface of the light-blocking film 14. The end of the light guide plate 32 engages into the slot 311. The light strip 33 is embedded in the slot 311 and attached to the heat sink 31. The light strip 33 is electrically connected to the control box 20 and carries multiple first light beads 331. These multiple first light beads 331 are arranged at intervals along the length of the light strip 33 and face the end face of the light guide plate 32. This arrangement allows light emitted from each first light bead 331 to enter the light guide plate 32 through its end face and then uniformly exit through the light-emitting surface 321. All multiple first light beads 331 are LED light beads. In some embodiment, the heat sink 31 is an elongated aluminum profile. The heat sink 31 is attached to the rear panel 12, enabling it to rapidly absorb heat generated by the light strip 33 and transfer it to the rear panel 12 for efficient heat dissipation. This ensures the light strip 33 maintains stable operation over extended periods. Moreover, the number of the heat sinks 31 is two and the two heat sinks 31 are symmetrically disposed at two ends of the light guide plate 32. The two end of the light guide plate 32 are respectively engaged with the slots 311 of the two heat sinks 31. Correspondingly, two light strips 33 are provided, each embedded in the respective slot 311 of the corresponding heat sink 31 and attached to the two heat sinks 31. The two light strips 33 are electrically connected to the control box 20. Multiple first light beads 331 on each light strip 33 face the two end faces of the light guide plate 32 respectively, enhancing the brightness of the light-emitting surface 321 of the light guide plate 32. Additionally, the light guide plate 32 adopts a rectangular plate structure. A reflective paper 34 is attached to the back surface of the light guide plate 32, ensuring that the majority of light is emitted through the light-emitting surface 321, thereby minimizing light loss.

The multiple warning light devices 40 are arranged around the periphery of the sealed cavity 101. Each warning light device 40 is electrically connected to the control box. The light emitted from the warning light device 40 is projected outward through the corresponding first through hole 141, the front panel 13, the reflective base film 15, and the corresponding second through hole 161. Specifically, the warning light device 40 includes a light panel 41 and a light shield 42. The light panel 41 is attached to the rear panel 12, enabling rapid heat transfer to the rear panel 12 for efficient heat dissipation. This ensures long-term stable operation of the light panel 41. The light panel 41 is electrically connected to the control box 20. The light panel 41 has multiple second light beads 411. The light shield 42 is fixed to the light panel 41 and defines light-emitting holes 421. These light-emitting holes 421 are positioned directly above the multiple second light beads 411 and align precisely with the corresponding first through holes 141. The multiple second light beads 411 are all LED light beads.

Additionally, a solar photovoltaic panel 50 is attached to the front surface of the reflective pattern film 16. This solar photovoltaic panel 50 is electrically connected to the control box 20. Multiple third through holes 51 and multiple third slot holes 52 for forming patterns are formed through both the front and back surfaces of the solar photovoltaic panel 50. The multiple third through holes 51 are arranged around the periphery of the solar photovoltaic panel 50 and respectively aligned with and in communication with multiple second through holes 161. The multiple third slot holes 52 are respectively aligned with and in communication with multiple second slot holes 162. When the solar photovoltaic panel 50 is exposed to sunlight, it converts light energy into electrical energy. This electrical energy is stored in the battery via the main control board within the control box 20.

The operational process of the embodiment is detailed as follows:

During use, the control box 20 incorporates a control circuit capable of regulating the on/off status and brightness levels of the main light-emitting device 30 and multiple warning light devices 40. Simultaneously, the control circuit can configure three output channels: one channel controls the warning light devices 40, offering selectable nighttime flashing or continuous flashing during daytime; a second channel controls the main light-emitting device 30 for constant nighttime illumination; and a third channel for radar control/activation of the warning light device 40 or controlling the main light-emitting device 30.

When the main light-emitting device 30 is energized, light emitted from the multiple first light beads 331 enters the light guide plate 32 through its end face, then exits via the light-emitting surface 321. Subsequently, the light sequentially passes through the multiple first slot holes 142, the front panel 13, the reflective base film 15, multiple second slot holes 162, and multiple third slot holes 52 to form a traffic sign pattern. In some embodiment, the traffic sign pattern is "STOP," but is not limited thereto. When the multiple warning light devices 40 are energized, the multiple second light beads 411 generate high-brightness flashing light. This high-brightness flashing light sequentially passes through the light-emitting hole 421, the first through hole 141, the front panel 13, the reflective base film 15, the corresponding second through hole 161, and the corresponding third through hole 51 to be emitted outward, thereby serving a warning function.

The design focus of the present application is that, by incorporating a main light-emitting device, this product achieves backlit self-illumination of its signage patterns. Combined with multiple warning light devices, it generates high-intensity flashing perimeter illumination. This design ensures visibility exceeding 1,000 feet, delivering exceptional visibility range and viewing angles. The highly conspicuous warning signage effectively prevents driving errors and traffic hazards, significantly enhancing operational performance.

The above is only some embodiments of the present application and is not intended to limit the present application. Any modifications, equivalent substitutions, and improvements made within the concept and principles of the present application shall be included in the scope of protection of the present application.

What is claimed is:

1. A backlit road traffic sign, comprising a housing body, a control box, a main light-emitting device, and multiple warning light devices;

wherein the housing body is configured as a flat structure and comprises a frame, a rear panel, a front panel, a light-blocking film, a reflective base film, and a reflective pattern film; wherein the rear panel is positioned on the rear side of the frame;

wherein the front panel is made of light-transmitting material and positioned on the front side of the frame, with the front panel, the rear panel, and the frame collectively enclosing a sealed cavity; wherein the light-blocking film is made of non-light-transmitting material and attached to the back surface of the front panel, with multiple first through holes and multiple first slot holes for forming patterns formed through a front surface and a back surface of the light-blocking film, the multiple first through holes arranged around a periphery of the light-blocking film;

wherein the reflective base film is made of a light-transmitting material and attached to a front surface of the front panel; wherein the reflective pattern film is made of a light-transmitting material and attached to a front surface of the reflective base film, with multiple second through holes and multiple second slot holes for forming patterns formed through a front surface and a rear surface of the reflective pattern film, the multiple second through holes arranged around a periphery of the reflective pattern film;

wherein the control box is mounted on a back surface of the rear panel;

wherein the main light-emitting device is disposed within the sealed cavity and electrically connected to the control box, light emitted from the main light-emitting device projected outward through the multiple first slot holes, the front panel, the reflective base film, and the multiple second slot holes sequentially;

wherein the multiple warning light devices are arranged around the periphery of the sealed cavity and electrically connected to the control box, light emitted from the warning light devices projected outward through the corresponding first through holes, the front panel, the reflective base film, and corresponding second through holes.

2. The backlit road traffic sign of claim 1, wherein the main light-emitting device comprises a heat sink, a light guide plate, and a light strip, and the heat sink forms a side-opening slot; wherein a front surface of the light guide plate is a light-emitting surface, and the light-emitting surface faces the back surface of the light-blocking film, with an end of the light guide plate engaging with the side-opening slot; wherein the light strip is embedded in the side-opening slot and attached to the heat sink, and electrically connected to the control box, carrying multiple first light beads, the multiple first light beads arranged at intervals along a length of the light strip and facing an end face of the light guide plate.

3. The backlit road traffic sign of claim 2, wherein a count of the heat sinks is two and the two heat sinks are symmetrically disposed at two ends of the light guide plate, with the two ends of the light guide plate respectively engaged with the side-opening slots of the two heat sinks; correspondingly, a count of the light strips is two and the two light strips are embedded in the side-opening slots of the heat sinks respectively and attached to the two heat sinks; wherein the two light strips are electrically connected to the control box, and the multiple first light beads on each light strip face the two end faces of the light guide plate respectively.

4. The backlit road traffic sign of claim 2, wherein a reflective paper is attached to the back surface of the light guide plate.

5. The backlit road traffic sign of claim 2, wherein the heat sink is an elongated aluminum profile.

6. The backlit road traffic sign of claim 1, wherein the warning light device comprises a light panel and a light shield, wherein the light panel, comprising the multiple second light beads, is attached to the rear panel and electrically connected to the control box; wherein the light shield is fixed to the light panel and defines light-emitting holes positioned directly above the multiple second light beads, with each light-emitting hole aligned with the corresponding first through hole.

7. The backlit road traffic sign of claim 1, wherein the frame is an aluminum frame, and wherein the rear panel is an aluminum plate.

8. The backlit road traffic sign of claim 1, wherein a mounting rail is fixed to the back surface of the rear panel.

9. The backlit road traffic sign of claim 8, wherein the mounting rails are two symmetrically arranged rails.

10. The backlit road traffic sign of claim 1, wherein a solar photovoltaic panel is attached to the front surface of the reflective pattern film and electrically connected to the control box, with multiple third through holes and multiple third slot holes for forming patterns formed through a front surface and a back surface of the solar photovoltaic panel; wherein the multiple third through holes are arranged around the periphery of the solar photovoltaic panel and respectively aligned with and in communication with the multiple second through holes, and wherein the multiple third slot holes are respectively aligned with and in communication with the multiple second slot holes.

* * * * *